United States Patent
Oyama et al.

(10) Patent No.: US 6,854,602 B2
(45) Date of Patent: Feb. 15, 2005

(54) HYDROGEN-SELECTIVE SILICA-BASED MEMBRANE

(75) Inventors: Shigeo Ted Oyama, Blacksburg, VA (US); Lixiong Zang, Blacksburg, VA (US); Doohwan Lee, Blacksburg, VA (US); Doug S. Jack, Ponca City, OK (US)

(73) Assignees: Conocophillips Company, Houston, TX (US); Virginia Polytechnic Institute & State University, Blacksburg, VA (US)

(*) Notice: Subject to any disclaimer, the term of this patent is extended or adjusted under 35 U.S.C. 154(b) by 0 days.

(21) Appl. No.: 10/162,058

(22) Filed: Jun. 4, 2002

(65) Prior Publication Data

US 2003/0222015 A1 Dec. 4, 2003

(51) Int. Cl.⁷ .......................... B01D 71/02; B05D 5/00
(52) U.S. Cl. .................. 210/490; 210/500.26; 95/55; 95/56; 96/4; 96/10; 96/11; 427/255.11; 427/255.12
(58) Field of Search ............... 210/490, 500.26, 210/651; 427/228, 244, 243, 245, 248.1, 255, 255.11, 255.12, 255.13, 255.1, 255.2, 255.3; 95/55, 56; 96/4, 8, 10, 11; 55/16, 158, 522; 501/11, 80; 502/4, 34, 53

(56) References Cited

U.S. PATENT DOCUMENTS

| | | | |
|---|---|---|---|
| 4,902,307 A | 2/1990 | Gavalas et al. | 55/16 |
| 5,186,833 A | 2/1993 | Mchenry et al. | 210/321 |
| 5,453,298 A | 9/1995 | Gavalas et al. | 427/245 |
| 5,789,024 A | 8/1998 | Levy et al. | 427/244 |
| 5,827,569 A | 10/1998 | Akiyama et al. | 427/243 |
| 6,478,853 B1 * | 11/2002 | Hara et al. | 95/56 |

FOREIGN PATENT DOCUMENTS

WO  WO 00/45940  8/2000  ......... B01D/53/22

OTHER PUBLICATIONS

A.K. Prabhu and S.T. Oyama, Development of a Hydrogen Selective Ceramic Membrane . . . , Chem. Lett., 1999, 213.

A.K. Prabhu and S.T. Oyama, Highly Hydrogen Selective Cermaic Membranes . . . , J. Mem. Sci., 2000, 176, 233–248.

S.T. Oyama et al., Modeling of the Methane Reforming Reaction in Hydrogen Selective . . . , J. Mem. Sci., 2000, 177, 83–95.

Yamaguchi et al., Reactive Control of Tetraethyl Orthosilicate . . . , Phys. Chem. Chem. Phys., 2000, 2, 4465–69.

* cited by examiner

Primary Examiner—Benjamin L. Utech
Assistant Examiner—Krishnan Menon
(74) Attorney, Agent, or Firm—Conley Rose P.C.

(57) ABSTRACT

A hydrogen permselective membrane, a method of forming a permselective membrane and an apparatus comprising a permselective membrane, a porous substrate and an optional intermediate layer are described. Using chemical vapor deposition (CVD) at low reactant gas concentration, high permselectivities are achieved with minimal reduction in hydrogen permeance.

47 Claims, 4 Drawing Sheets

HYDROGEN-SELECTIVE SILICA-BASED MEMBRANE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates generally to inorganic membranes that are permeable to small gas molecules. More particularly, the present invention relates to permeable membranes deposited on porous substrates, with or without an intermediate porous layer, that exhibit both a high hydrogen permeance and a high hydrogen permselectivity.

2. Description of the Related Art

Permeable materials are those through which gases or liquids may pass. Membranes are one type of permeable material and are composed of thin sheets of natural or synthetic material. Frequently, membranes exhibit different permeances—i.e., permeation rates—for different chemical species. In this regard, permselectivity is the preferred permeation of one chemical species through a membrane with respect to another chemical species. Permselectivity of the desired permeate with respect to another chemical species is calculated as the ratio of the permeance of the desired permeate to the permeance of the other chemical species.

Permselective membranes are promising in a variety of applications including gas separation, electrodialysis, metal recovery, pervaporation and battery separators. Recently, interest has developed in using permselective membranes in so-called membrane reactors, which allow the simultaneous production and selective removal of products. One regime in which permselective membranes are particularly promising is that of equilibrium-limited reactions. In such reactions, yields are reduced by reaction reversibility. Preferential removal of one or more of the reaction products effectively shifts the equilibrium—or, stated differently, decreases the rate of the reverse reaction—thereby overcoming thermodynamic limitations.

One example of an equilibrium limited reaction is the methane dry-reforming reaction [1]:

$$CH_4 + CO_2 \Leftrightarrow 2CO + 2H_2 (\Delta H°_{298} = 247 \text{ kJ·mole}^{-1}) \quad [1].$$

This reaction provides a pathway to convert carbon dioxide, a problematic greenhouse gas, and methane, a plentiful natural resource, into synthesis gas—i.e., a mixture of hydrogen and carbon monoxide. Synthesis gas is an industrially important feedstock that is used in the preparation of ethylene glycol, acetic acid, ethylene, fuels and several other commercially important chemicals. Unfortunately, the conversion of methane and carbon dioxide to synthesis gas is limited by the reversability of the reaction—i.e., the ability of hydrogen and carbon monoxide to regenerate methane and carbon dioxide. The yield can be improved, however, by selectively removing one or both of the products as they are formed. Doing so mitigates the extent of the reverse reaction.

Other examples of equilibrium-limited reactions that produce hydrogen gas are the decomposition of hydrogen sulfide [2] and ammonia [3]:

$$H_2S \Leftrightarrow S(s) + H_2 \quad [2]$$

$$2NH_3 \Leftrightarrow N_2 + 3H_2 \quad [3].$$

Hydrogen sulfide and ammonia are frequent and undesirable byproducts of numerous chemical reactions. Thus, reactions [2] and [3] offer an abatement technique for reducing the levels of these compounds. Like the methane dry-reforming reaction, the products of these reactions can be favored by removing hydrogen as it is produced. In short, hydrogen permselective membranes offer the potential to overcome several equilibrium-limited reactions in commercially useful ways.

Organic polymer-based membranes have been demonstrated in a variety of commercially-viable processes such as filtration, microfiltration, ultrafiltration and reverse osmosis. Although permselective polymer-based membranes exist, inherent limitations preclude their use in many applications. Polymeric membranes cannot be used at high temperatures and pressures: typical polymeric membranes cannot withstand temperatures in excess of 150° C. or pressure differentials in excess of several atmospheres. Consequently, these membranes have limited utility in applications such as high temperature membrane reactors and high pressure gas purifiers. For example, the methane dry-reforming reaction, even under catalytic conditions, usually entails temperatures of approximately 600° C. or more. In addition, polymeric membranes frequently cannot be cleaned with strong acids, bases and oxidizing agents because of their chemical reactivity.

Inorganic membranes have attracted much attention in the past decade because of their chemical, thermal and mechanical stability. The robustness of inorganic membranes compared to their polymeric counterparts permits their use in harsh environments such as chemical reactors. Thus, inorganic membranes offer the possibility of surmounting thermodynamic equilibrium limitations through the simultaneous formation and removal of reaction products, even in harsh environments. To be useful in this capacity, the membrane should exhibit a high permeability with respect to a reaction product while maintaining a low permeability to the reactants. In short, a suitable membrane for a membrane reactor should provide both high selectivity for a particular permeate—i.e., a high permselectivity—and a high permeability for that permeate.

The mechanism of separation in membranes limits their permselectivity. For example, the separation of gaseous species through Vycor™ glass membranes has been shown to proceed through Knudsen diffusion, a mechanism based upon molecular diffusion through the pores that decreases with increasing temperature. Because Knudsen diffusion is proportional to the inverse square root of the molecular weight of a species, the maximum selectivity obtainable is severely limited. For example, under Knudsen diffusion, the best selectivity that can be achieved for hydrogen (molecular weight 2) with respect to the molecules methane (molecular weight 16), carbon monoxide (molecular weight 28) and carbon dioxide (molecular weight 44) ranges from 2.8 to 4.9. This limitation can be overcome using inorganic membranes that operate outside the limitations of Knudsen diffusion and that exhibit better selectivities.

Deposition chemistries and techniques can profoundly affect membrane selectivity and permeability. Unfortunately, increasing permselectivity is frequently accomplished only at the expense of permeation rates: highly permselective membranes generally offer unacceptably low permeation rates for the desired permeate. A suitable membrane for commercial processes should offer both high permselectivity and permeability with respect to the desired permeate.

Several techniques, such as sol-gel processing and chemical vapor deposition (CVD), exist for depositing inorganic films. Sol-gel processing has been shown to provide higher permeability than CVD methods. Unfortunately, the sol-gel method suffers from a lack of reproducibility that makes it unattractive from a commercial perspective. CVD is a well-known method for depositing thin films and offers highly uniform and reproducible film deposition. CVD has been employed in the semiconductor industry for depositing layers of conducting and insulating materials during wafer processing. Consequently, reproducible and accurate techniques for the deposition of thin CVD films are well known. Although CVD offers numerous advantages such as highly selective and reproducible films, it requires substantial capital investment. Perhaps more importantly, acceptable permselectivities in prior art CVD membranes have come at the cost of unacceptably high losses in permeability.

Among the most promising inorganic membrane materials is silica. Several publications and patents have reported the preparation of silica-based membranes for the separation of hydrogen at high temperature. These are summarized in a recent publication, A. K. Prabhu and S. T. Oyama. *J. Membr. Sci.* 2000, 176, 233, which is hereby incorporated herein by reference. Silica membranes can be engineered to exhibit permselectivity to hydrogen. However, hydrogen permeances have been unacceptably low for commercial processes.

Furthermore, conventional silica membranes typically suffer from significant susceptibility to moisture at high temperatures and drastic losses in permeability over short time frames have been reported. This loss in permeability has been attributed to the removal of hydroxyl moieties from Si—OH groups and the concomitant formation of Si—O—Si bonds that close pores channels, thereby decreasing permeance. This phenomenon has been termed densification.

U.S. Pat. No. 5,453,298 ("the '298 patent") discloses the deposition of silica membranes from various silicon precursors, including silicon halides (e.g., $SiCl_4$), chlorinated silanes (e.g., $SiH_3Cl$) and chlorinated siloxanes (e.g., $Cl_3SiOSiCl_2OSiCl_3$) onto porous Vycor™ glass or alumina substrates. In each case, the silica product was formed through the reaction of the silicon precursor with moisture and/or oxygen. The '298 patent discloses that gas phase reactions between the silicon precursor and moisture result in particles that can adhere to the tube wall, decreasing permeability and inducing thermomechanical stresses that can result in membrane cracks and failure. To address this problem, the '298 patent teaches the use of the "alternating flow deposition" method in which the silica film was deposited by exposing the porous substrate to the silicon precursor, evacuating the system so as to remove all silicon precursor except that already adsorbed on the Vycor™ surface, and then admitting water vapor to react with the adsorbed silicon precursor. The '298 patent also notes that the "opposing reactants deposition" technique, in which one reactant is admitted on one side of the porous substrate and the other reactant is admitted on the other side of the porous substrate with reactions occurring inside the pores, causes undesirably thick deposits in the pores of the substrate. The '298 patent reports a silica membrane having a hydrogen permeance of approximately 0.20 $cm^3$ (STP)/min·atm·$cm^2$, or $1.5 \times 10^{-8}$ mol/$m^2$·s·Pa, with a $H_2$:$N_2$ permselectivity of about 3000. According to the '298 patent, the hydrogen permeance drops "considerably" upon exposure to high temperatures, especially when moisture is present.

In Yamaguchi et al., *Phys. Chem. Chem. Phys.*, 2000, 2, 4465–4469, researchers at the University of Tokyo have reported a CVD silica membrane deposited on an α-alumina porous tubular substrate with an intermediate γ-alumina layer deposited by sol-gel chemistry. The CVD membrane was prepared from tetraethyl orthosilicate (TEOS) and ozone ($O_3$). The reaction employed opposing reactants deposition in which TEOS was admitted to the outer "shell" side of the porous tubular substrate while $O_3$ in oxygen was admitted to the inner "tube" side of the porous tubular substrate. The deposition was performed at between 175° C. and 300° C. using a silicon precursor concentration of between 0.4 and 2.1 mol/$m^3$ (STP). Although permeation data was reported for several gases, no permeation data was reported for $H_2$.

Recently, one of us presented a new membrane, called Nanosil, with 100 percent permselectivity for hydrogen with respect to $CH_4$, CO, $CO_2$ and $H_2O$ in PCT Patent Application PCT/U500/02075 (2000), which is hereby incorporated herein by reference. The Nanosil membrane was prepared by CVD of TEOS onto a porous Vycor™ glass substrate at high temperature in the absence of oxygen or steam. The Nanosil membrane demonstrates marked resistance to moisture: the membrane lost only four percent of its permeability after exposure to ten percent moisture in argon at 873° K for 100 hours. Furthermore, the membrane exhibited tremendous selectivity for hydrogen gas. However, the hydrogen permeance for the membrane was approximately $10^{-8}$ mol/$m^2$·s·Pa, which is less than that desirable for commercial applications.

Thus, currently available inorganic permselective membranes exhibit undesirably low permeances and are frequently susceptible to moisture. There is substantial interest in an inorganic membrane having a high permselectivity and permeability for hydrogen while exhibiting minimal susceptibility to moisture damage at high temperatures.

SUMMARY OF THE PREFERRED EMBODIMENTS

One preferred embodiment of the present invention is directed to permselective asymmetric membranes comprised of a porous surface layer and a porous substrate layer that exhibit high permeance and high permselectivity. The porous surface layer is deposited by chemical vapor deposition (CVD) of a low concentration CVD reactant gas in a CVD gas stream.

Another preferred embodiment of the present invention is directed to permselective asymmetric membranes comprised of a porous surface layer, one or more porous intermediate layers, and a porous substrate layer. The porous surface layer and at least one porous intermediate layer are deposited by CVD of a CVD reactant gas in a CVD gas stream.

Yet another preferred embodiment of the present invention is directed to permselective asymmetric membranes comprised of a porous surface layer and a porous substrate layer that exhibit a permeance of at least $5 \times 10^{-8}$ mol/$m^2$·s·Pa for a desired permeate and a permselectivity of at least 100 for the desired permeate relative to one or more undesired permeates.

Another preferred embodiment of the present invention is directed to methods for preparing permselective asymmetric membranes that include depositing a porous surface layer and one or more porous intermediate layers on a porous substrate layer wherein the porous substrate layer and at least one of the one or more porous intermediate layers are deposited by chemical vapor deposition using a CVD reactant gas in a CVD gas stream.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENT

The present invention derives, in part, from the discovery that deposition conditions, especially low CVD reactant gas concentrations, can provide an unprecedented combination of high permeance and high permselectivity for hydrogen. The present invention also derives, in part, from the discovery that multilayered membranes can provide significant benefits over two-layered membranes, even when the multiple layers result from deposition of the same precursors using different deposition conditions.

Membranes may be classified on the basis of the gradation in the size of the pores through the membrane. A. J. Burgraaf and L. Cot, Fundamentals of Inorganic Membrane Science and Technology, Elsevier, Amsterdam, 1996, which is hereby incorporated herein by reference. Symmetric membranes have uniform pores while asymmetric membranes have graded pores. Asymmetric membranes are routinely made from organic polymeric materials. Proper casting and drying techniques allow the preparation of thin layers having small pores on one side of a thicker polymer sheet having larger pores. These asymmetric organic polymer membranes have proved useful in a number of low temperature separation techniques.

Figure 1:
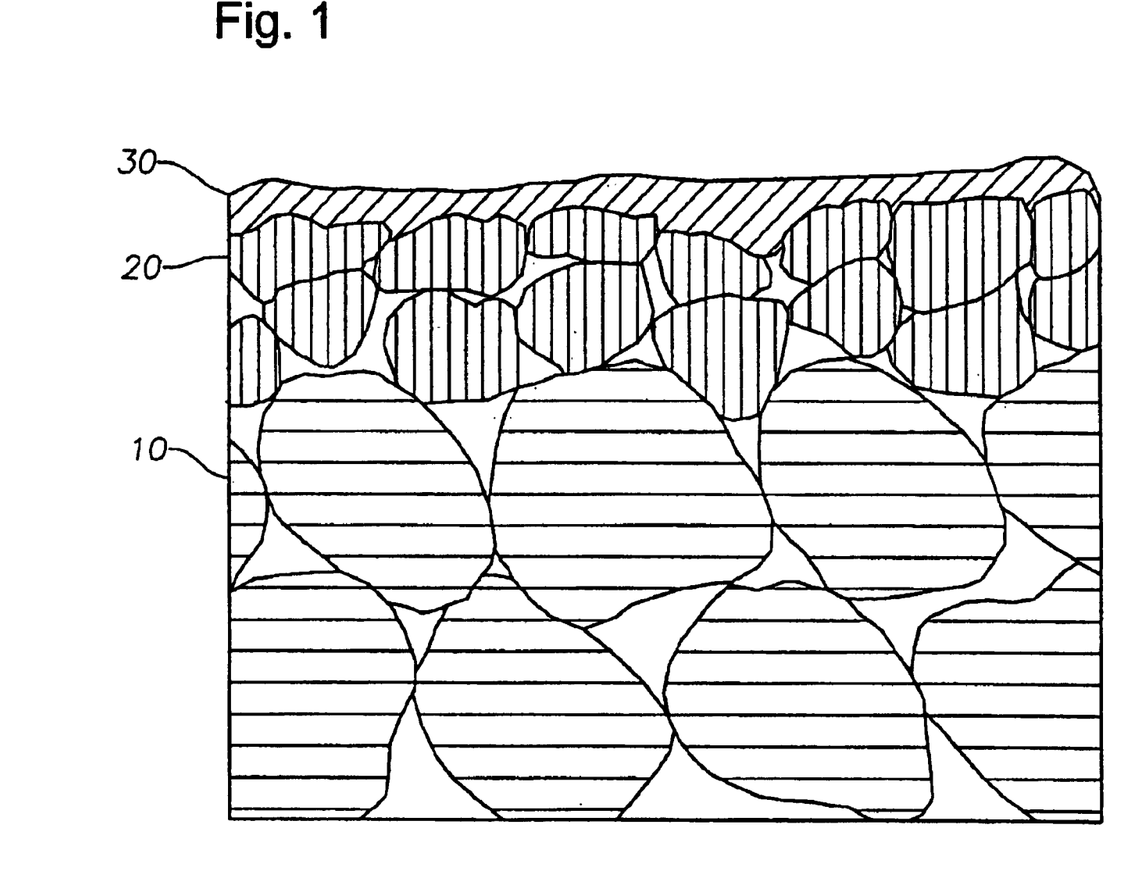
FIG. 1 is a schematic of a three-layer composite membrane.

Asymmetric membranes may also be obtained from inorganic materials. Such membranes are often composites of two or three components arranged in layers, but may be composed of four or more layers. A three-layer asymmetric membrane is depicted in FIG. 1. The first component comprises substrate 10 that establishes the shape and macroscopic dimensions of the final ensemble. Its shape is usually that of a flat plate, disk or tube. Substrate 10 is typically a coarse material having large pores. The second component in FIG. 1 is intermediate layer 20 of a material having medium size pores that is deposited on substrate 10. The third component is relatively thin surface layer 30, usually of dimensions from nanometers to micrometers, which has very small pores. This last component frequently controls the permeability and porosity of the entire membrane ensemble. Thus, the layers in an asymmetric membrane generally have a gradation of increasingly smaller pores.

Individual layers can be created in a number of different ways. For example, different layers can be prepared by depositing different materials (e.g., alumina and silica) using one or more of a variety of different deposition techniques (e.g., sol-gel processing and CVD). However, distinct layers in an asymmetric membrane can also be created by depositing the same or similar materials using the same deposition technique under different processing conditions. As demonstrated in the examples below, changes in CVD reaction conditions—e.g., temperature, pressure and reactant gas concentration—can result in films with markedly different properties—e.g., permeance and permselectivity. Consequently, multiple layers can be formed by depositing, for example, the same or similar CVD materials under two or more deposition condition regimes. As used herein, the term deposition conditions includes pressure, temperature, reactant gas concentration and any other parameter that affects film quality and properties. The term multilayer asymmetric membranes as used herein refers to asymmetric membranes having two or more distinct layers with different properties irrespective of whether the layers are composed of the same or similar material—e.g., silica—and irrespective of whether the same deposition technique—e.g., CVD—was used to create them. Similarly, one layer is distinct from another irrespective of their elemental compositions if the layers exhibit different properties or three dimensional structures.

Some of the preferred embodiments of the present invention employ thin hydrogen-selective permeable inorganic membranes deposited on porous substrates without an intermediate layer between them. Such embodiments are referred to herein as two-layer arrangements. Other preferred embodiments of the present invention employ three-layer arrangements in which an intermediate layer is deposited between the outer membrane layer and the porous substrate. The preferred embodiments of the present invention exhibit high permselectivity for hydrogen while retaining a large hydrogen permeance. Some preferred embodiments of the present invention comprise two different CVD silica layers deposited on a porous alumina substrate. Other preferred embodiments of the present invention comprise a CVD silica film deposited on an alumina sol-gel layer deposited on a porous alumina or porous stainless steel substrate. A person of ordinary skill will recognize, however, that the present invention may include four layer or even more complex arrangements and therefore is not limited to two or three layer arrangements.

The substrate of the preferred embodiments provides mechanical support for the deposited layer or layers, including the permselective membrane, ideally without impeding the passage of the desired permeate through the membrane. The substrate is desirably a porous material that is inert at elevated temperatures. Preferred substrates include porous stainless steel substrates and porous alumina substrates. However, it should be evident to those skilled in the art that the current invention also applies to other substrates including but not limited to Vycor™ glass, titania, zirconia, zeolite, similar materials and combinations thereof.

The preferred embodiments of the present invention employ a Nanosil silica membrane formed by CVD of TEOS without the addition of oxygen, ozone or moisture. As used herein, a reactant gas stream lacks a substantial concentration of oxygen, ozone and moisture if the incoming gas stream contains less than about 0.1 volume percent oxygen, ozone and moisture. Previously, this membrane demonstrated unprecedented hydrogen permselectivity, although at significantly reduced hydrogen permeance. However, as is apparent to one of ordinary skill in the art, silica deposition can be carried out with TEOS in the presence of oxygen-containing compounds. Furthermore, other silica precursors exist including, but not limited to, other tetraethyl silicates, tetraisopropyl silicates, tetramethyl silicates, and chlorosilanes including chloro-, dichloro-, and trichloromethyl silanes as well as other silicon compounds. Thus, the choice of Nanosil as the membrane material in the preferred embodiments is not intended to limit the scope of the invention.

Furthermore, although the preferred embodiments of the present invention teach the use of silica membranes, a person of ordinary skill in the art will recognize that other inorganic materials fall within the scope of the present invention. For example, the discovery that low CVD reactant concentration allows higher permselectivity for hydrogen while minimizing hydrogen permeance loss will likely extend to other membrane systems and possibly other permeates. Furthermore, the improvement achieved by, for example, depositing CVD material under multiple deposition conditions should apply equally to other inorganic materials. Thus, the use of silica membranes in the preferred embodiments of the present invention is not intended to limit the scope of the present invention. Useful membrane materials include, but are not limited to, alumina, zirconia, titania, silicon nitride, silicon carbide, zeolites, metals and other recognized membrane materials. As used herein, the term CVD reactant gas refers to the gas or gases being deposited in the CVD process. As used herein, the term CVD gas stream refers to the CVD reactant gas as well as any associated inert carrier gases.

Some of the preferred embodiments of the present invention employ a CVD deposition temperature of about 600° C. However, it is well known that CVD of silica, as well as other materials, can be performed over a wide temperature range. For example, CVD of silica is conventionally performed in the semiconductor industry at between about 400° C. and about 1100° C. The choice of temperature controls not only the deposition rate but also the porosity of the resulting film: low temperatures typically result in a low deposition rate and a more porous film. Consequently, film quality, permeance and permselectivity can be tailored, in part, through careful control of the CVD reaction temperature.

The preferred embodiments of the present invention deposit the permselective membrane using atmospheric pressure CVD (APCVD), meaning that the deposition occurs at approximately atmospheric pressure. However, a variety of CVD techniques exist including low pressure CVD (LPCVD), plasma enhanced CVD (PECVD) and high pressure CVD (HPCVD). Frequently, LPCVD and PECVD are performed at pressures at or below 10 torr whereas HPCVD is typically performed at pressures up to 10 atmospheres or higher. Each of these techniques has advantages that have been reported in various technological fields, primarily the semiconductor industry. Thus, a person of ordinary skill will recognize that the choice of CVD technique in general, and the choice of deposition pressure in particular, may be made on the basis of desired membrane film properties and that the choice of APCVD is not intended to limit the scope of the invention.

CVD reactant gases are frequently carried in inert diluents such as nitrogen or argon and CVD reactant gas concentration in the CVD gas stream is a controllable parameter in a CVD process. In the case of liquid precursors, the CVD reactant gas stream is frequently generated by passing a stream of diluent gas through a bubbler, which contains the liquid CVD material. Increasing the temperature of the bubbler typically increases the partial pressure of the CVD material, thereby increasing the concentration of the CVD reactant gas in the gas stream. An appropriate gas dilution system can then further adjust the concentration of the CVD reactant gas. Without limiting the scope of the invention, the TEOS concentration in the CVD gas stream used in the preferred embodiments of the present invention range from 0.112 moles per cubic meter (mol/m$^3$) down to 0.02 mol/m$^3$. Preferably, the TEOS concentration in the CVD gas stream is between 0.02 and 0.03 mol/m$^3$. Lower concentrations may result in even higher quality films, although deposition time will increase for the same film thickness.

The preferred embodiments of the present invention utilize CVD to deposit the permselective membrane. However, several alternatives to CVD exist. For example, silica films can be deposited using a variety of so-called spin-on glasses such as alkoxysilanes, acyloxysilanes or polysiloxanes in an appropriate solvent. These precursors to silica can be deposited as liquids on a surface and subsequently decomposed at elevated temperatures with or without initiator compounds to yield silica. In addition, spin-on silicon-based compounds such as hydrogen silsesquioxanes may serve as carbon-free silica precursors and potentially provide more pristine and better performing silica films. Such silsesquixoanes have been shown to provide better step coverage in semiconductors and can be reflowed for uniformity prior to high temperature silica formation.

Another well known alternative to CVD is sol-gel deposition. A sol gel generally refers to a colloidal suspension of particles that is gelled to form a solid. Sol gels can be formulated from various inorganic materials including silica, alumina, titania, and many others. Some of the preferred embodiments of the present invention employ an intermediate layer of alumina deposited by sol-gel processing between the porous substrate and the outer membrane. In the preferred embodiments, an alumina sol is used as described below. However, as will be recognized by a person of ordinary skill, the choice of the sol-gel technique in general and the choice of an alumina sol in particular are merely an exemplary method and material for preparing the intermediate layer. Other sol gel materials may be used in the present invention including but not limited to silica and titania. Furthermore, other techniques such as CVD may serve as the deposition method for any intermediate layers in the permselective membrane apparatus.

Preferably, the permselective membrane exhibits a permeance to a desired permeate of at least $5 \times 10^{-8}$ mol/m$^2 \cdot$s$\cdot$Pa. More preferably, the permselective membrane exhibits a permeance to a desired permeate of at least $1 \times 10^{-7}$ mol/m$^2 \cdot$s$\cdot$Pa. Preferably, the permselective asymmetric membrane exhibits a permselectivity of at least 100 for the desired permeate relative to one or more undesired permeates. More preferably, the permselective asymmetric membrane exhibits a permselectivity of at least 300 for the desired permeate relative to one or more undesired permeates.

Preparation of the Porous Substrates

The permselective membrane of the preferred embodiments was deposited on 3–4 cm lengths of porous tubular alumina and porous tubular stainless steel filters. To accommodate the deposition apparatus, the porous alumina and stainless steel tubing was connected on both sides to appropriate lengths of standard non-porous alumina and stainless steel tubing, respectively, according to the following processes.

Figure 2:
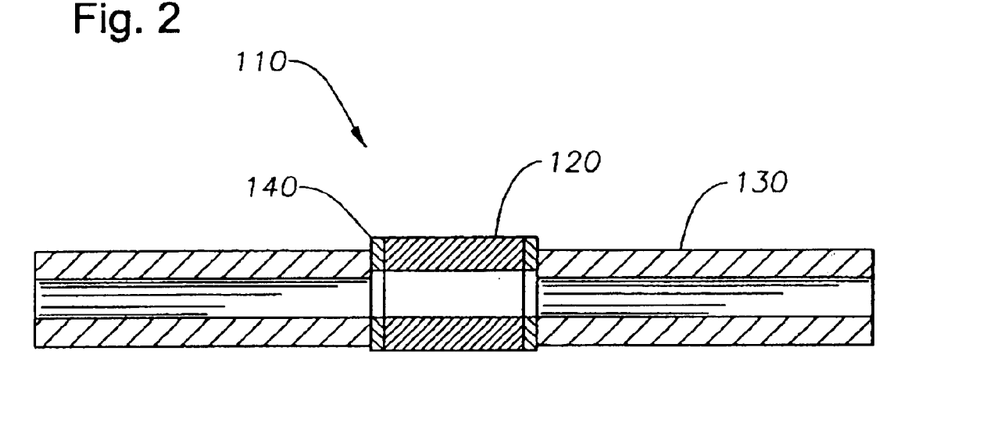
FIG. 2 is a schematic side view of the connection of a piece of porous alumina filter to non-porous alumina tubing.

The construction of the porous alumina substrate 110 is depicted in FIG. 2. Tubular ceramic filters purchased from US Filter (DeLand, FL, Part Number: S700-00117) having a mean pore size of 5 μm, an outer diameter (O.D.) of 10 mm, and an inner diameter (I.D.) of 7 mm were used as supports for the permselective membranes. The ceramic filters were cut into lengths of approximately 3 cm with a diamond saw. They were then boiled in water to remove impurities and particles formed during cutting and were subsequently dried. As shown in FIG. 2, both ends of a tubular filter 120 were connected to sections of dense—i.e., nonporous—99 percent alumina tubing 130 (Vesuvius McDaniel, Beaver Falls, Pa.) (O.D. ⅜", I.D. ¼") by a ceramic seal 140 to form the porous alumina substrate 110. The ceramic seal 140 was created using a layer of glaze suspension (Duncan IN 1001) applied at the joint between the ceramic filter 120 and the dense ceramic tubing 130. Then the assembly was placed into a quartz tube holder and pressed together so as to keep the tube pieces straight and aligned. After calcinations at 870° C. for 2 hours, the filter was joined to the dense ceramic tubing by a strong, thermally-stable joint. In order to ensure that there would be no pinholes, a layer of glaze was again applied at the joint and the assembly was calcined a second time. Then the porous alumina substrate 110 was ready for the preparation of the silica membrane.

Commercial tubular porous stainless steel filters purchased from Mott Corporation composed of 316L stainless steel and having an O.D. of ⅜", an I.D. ¼" and a mean pore size of 200 nm were also used as supports for the permselective membranes. The filters were cut into 6 centimeter lengths and were machined to reduce the O.D. on the ends. This allowed the pieces to be inserted into dense stainless steel tubing for connection. The joints were then made by standard welding in air.

Sol Gel Deposition

In some preferred embodiments, three-layer arrangements were prepared by modifying the tubular filters with an intermediate alumina layer before depositing the permselective membrane. This intermediate alumina layer was a boehmite sol prepared as reported in J. Mater. Sci., 27, 527 (1992), which is hereby incorporated by reference. Briefly, the preparation is as follows. First, a boehmite sol was prepared by adding dropwise $Al(OBu)_3$ to water (1.5 liters $H_2O$ per mole alkoxide), which was heated above 80° C. and stirred at high speed. This was followed by the addition of 0.07 moles of nitric acid per mole butoxide. The resulting colloidal suspension was kept boiling until most of the butanol had evaporated and was then refluxed for 16 hours to form a stable boehmite sol. Then, a polyvinyl alcohol (PVA) solution was prepared by adding 3.5 grams PVA (MW=72,000) to 100 milliliters (ml) boiling water under vigorous stirring, followed by addition of 5 ml 1M nitric acid and refluxing for 4 hours. A dipping solution was formed by adding 20 ml of the PVA solution into 30 ml of the 1M boehmite solution. Finally, a 0.05 M alumina dipping solution was prepared by adding distilled water. The inside of the porous filter, after having been connected to nonporous tubing as described above, was dipped into the 0.05 M alumina dipping solution for 5 seconds (dip coating). The resulting alumina filter was dried at room temperature and then calcined in air at 620° C. for 3 hours using a 1° C./min heating rate to reach the final temperature.

Apparatus and Method for the CVD of the Permselective Membrane

Figure 3:
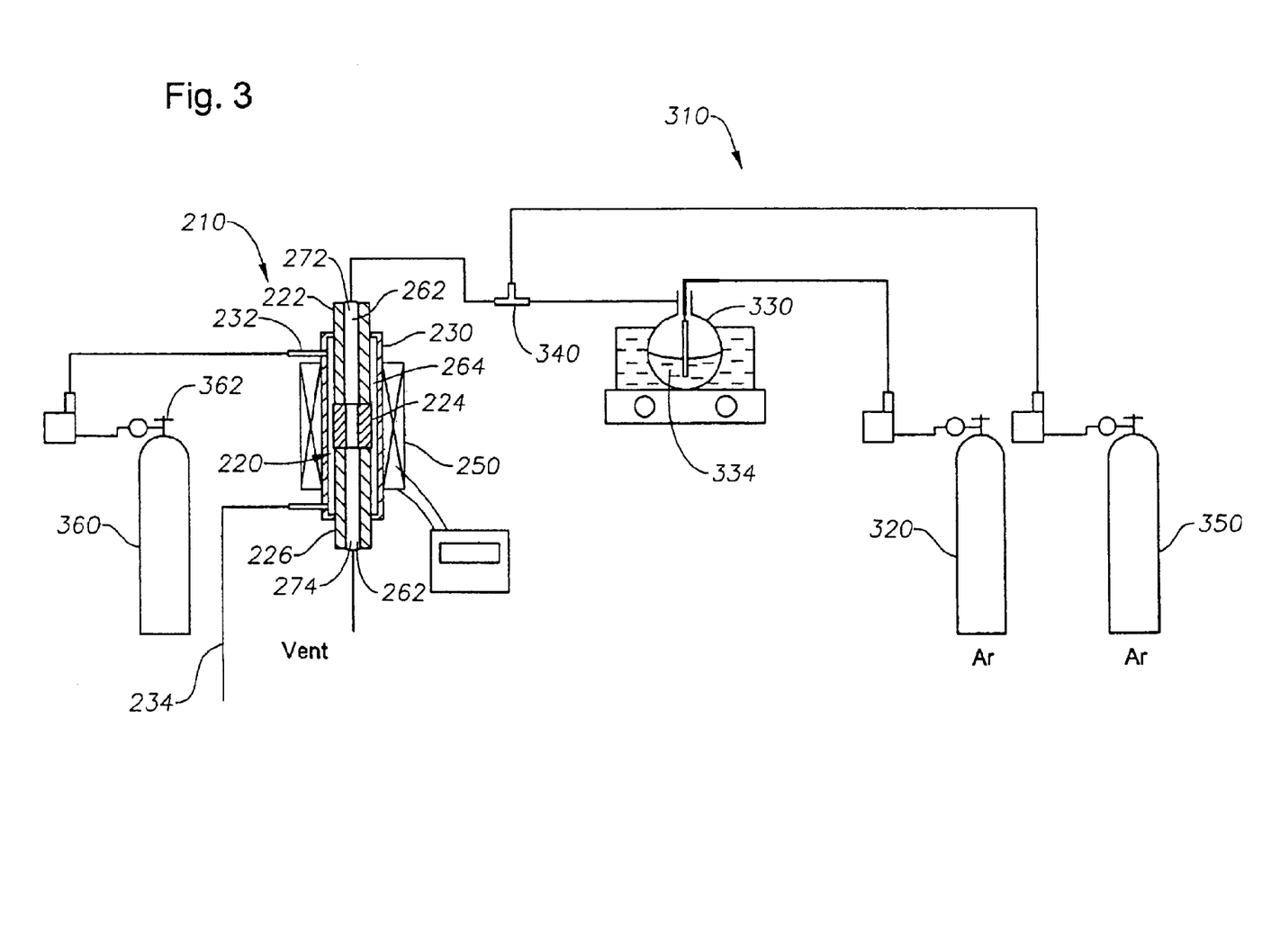
FIG. 3 is a schematic of the chemical vapor deposition (CVD) apparatus used in the preparation of the permselective membrane of the preferred embodiment.

The APCVD apparatus used for this work is depicted schematically in FIG. 3 and is similar to that used in PCT Patent Application PCT/US00/02075, which has been incorporated by reference. Briefly, the reactor assembly 210 for depositing the permselective membrane on the porous substrate 220 comprises an outer concentric, nonporous tubing 230 and a temperature-controlled heater 250. The porous substrate 220 is surrounded by outer concentric, nonporous tubing 230 of larger diameter, thus forming annulus 34, which is depicted as a cross section in FIG. 4. As disclosed above and in FIG. 3, the porous tubing 220 has nonporous segments 222 and 226 at opposite ends and porous section 224 located between nonporous segments 222 and 226. The inside of the porous tubing 220 is referred to herein as the "tube" side 262 whereas the outside of the porous tubing 220 that is located inside the outer concentric, nonporous tubing 230 is referred to as the "shell" side 264. The concentric tubing 220 and outer concentric, nonporous tubing 230 are located in temperature-controlled heater 250.

A CVD reactant gas is generated by gas dilution system 310 as depicted in FIG. 3. Carrier gas from carrier gas cylinder 320 passes through a temperature-controlled bubbler 330 containing the liquid CVD material 334. The carrier gas saturated with CVD reactant gas then flows through a tee 340, in which it is mixed with dilution gas flowing from a dilution gas cylinder 350. The mixed gas stream containing the CVD reactant gas, carrier gas and dilution gas then passes into the upstream end 272 of the tube side of the porous tubing, through the porous tubing, and out the downstream end 274 of the tube side of the porous tubing. The concentration of the CVD reactant gas in the CVD gas stream can be varied considerably and accurately by adjusting the temperature of the bubbler 330 as well as the mass flow controllers located downstream of the carrier gas cylinder 320 and the dilution gas cylinder 350.

The recipes for the CVD gas stream and the resulting CVD reactant gas concentrations are shown in Table 1, below. In each case, the bubbler was maintained at 25° C. and the concentration

TABLE 1

CVD Conditions for the Preparation of TEOS-Based Silica Membranes

|  | Recipe I | Recipe II | Recipe III | Recipe IV |
| --- | --- | --- | --- | --- |
| Carrier Gas (ml/min) | 36.5 | 4.4 | 4.4 | 4.4 |
| Dilution Gas (ml/min) | 0 | 11.7 | 11.7 | 18.6 |
| Balance Gas (ml/min) | 25.0 | Vacuum | 29.3 | 23.0 |
| TEOS Concentration $(mol/m^3)$ | 0.112 | 0.03 | 0.03 | 0.02 | of TEOS in the carrier gas is 0.112 $mol/m^3$. The final concentration of TEOS in the reactant gas stream is calculated as 0.112 $mol/m^3$ times a dilution factor resulting from the dilution gas. The dilution factor equals the carrier gas flow rate divided by the sum of the carrier and dilution gas flow rates. Thus, for example, in Recipe II, the TEOS concentration in the CVD gas stream equals $$0.112 \text{ mol/m}^3 \times [4.4/(4.4+11.7)] = 0.03 \text{ mol/m}^3.$$

The balance gas flow rate does not affect the TEOS concentration in the CVD gas stream and therefore is not pertinent to the calculation.

The environment surrounding the exterior of the porous tubing 220—i.e., the shell side 264—is controlled using either a purge gas or a vacuum. When a purge gas is used, the purge gas from purge gas cylinder 360, see FIG. 3, enters through a gas inlet 232 in the outer concentric, nonporous tubing 230 and passes out through a gas vent 234 located at the other end of the an outer concentric, nonporous tubing 230. Alternatively, the environment surrounding the exterior of the porous tubing 220 can be evacuated using a vacuum pump (not shown). This is accomplished by connecting a vacuum pump to gas vent 234 and closing valve 362 just downstream of purge gas cylinder 360, thereby establishing an airtight seal.

Analytical Testing

Permeances were determined by gas chromatography using a thermal conductivity detector. The separation was performed on a carbosphere™ column.

EXAMPLE 1

The porous ceramic filter connected to dense ceramic tubing by the method described above was subjected to the deposition of a silica layer according to the CVD process described above and in PCT Patent Application PCT/US00/02075. CVD Recipe I on Table 1 was used. Briefly, TEOS was introduced through a bubbler using Ar as a carrier gas at 36.5 ml/min on the inner side of the tubular membrane, while a flow of Ar at 25.0 ml/min was maintained on the shell side of the reactor assembly. The deposition was conducted at 600° C. for 24 hours. Table 2 shows the hydrogen and argon permeances at 600° C. before and after the deposition. Ar, $CO_2$, and $CH_4$ could not be detected by gas chromatography after the CVD process. The $H_2/Ar$ permselectivity was estimated to be more than 1,000.

TABLE 2

Gas Permeation of a Ceramic Filter Before and After CVD at 600° C.

| | Permeance ($mol/m^2 \cdot s \cdot Pa$) | | Permselectivity $H_2/Ar$ |
|---|---|---|---|
| | $H_2$ | Ar | |
| Before CVD | $4.25 \times 10^{-5}$ | $9.91 \times 10^{-6}$ | 4.29 |
| After CVD | $4.32 \times 10^{-9}$ | Not Detectable | >1000 |

No intermediate porous layer between the permselective membrane and the support was used in this example. Thus, Example 1 is a two-layer arrangement. The concentration of TEOS in the CVD gas stream was $0.112 \text{ mol/m}^3$, at the upper end of the concentration range tested. The results were consistent with the prior work reported in PCT Patent Application PCT/US00/02075 inasmuch as high selectivity was obtained at the cost of a significantly decreased hydrogen permeance—i.e., the CVD permselective membrane caused a ten thousandfold decrease in the hydrogen permeance from $4.25 \times 10^{-5} \text{ mol/m}^2 \cdot s \cdot Pa$ to $4.32 \times 10^{-9} \text{ mol/m}^2 \cdot s \cdot Pa$.

EXAMPLE 2

The porous ceramic filter connected to dense ceramic tubing by the method described above was subjected to the deposition of a silica layer according to the aforementioned CVD process. First CVD Recipe I was used. TEOS was introduced through a bubbler using Ar as a carrier gas at 36.5 ml/min on the inner side of the tubular membrane, while a flow of Ar at 25.0 ml/min was maintained on the shell side of the reactor assembly. The deposition was conducted at 600° C. for 3 hours. Table 3 shows the hydrogen and argon permeances and $H_2/Ar$ permselectivity at 600° C.

TABLE 3

Gas Permeation of a Ceramic Filter Before and After CVD at 600° C.

| | Permeance ($mol/m^2 \cdot s \cdot Pa$) | | Permselectivity |
|---|---|---|---|
| | $H_2$ | Ar | $H_2/Ar$ |
| Before CVD | $5.11 \times 10^{-5}$ | $1.26 \times 10^{-5}$ | 4.0 |
| Recipe I | $6.95 \times 10^{-8}$ | $9.88 \times 10^{-10}$ | 70 |
| Recipe II | $6.68 \times 10^{-8}$ | $1.01 \times 10^{-10}$ | 661.14 | before and after the deposition. The hydrogen permeance decreased from $5.11 \times 10^{-5} \text{ mol/m}^2 \cdot s \cdot Pa$ to $6.95 \times 10^{-8} \text{ mol/m}^2 \cdot s \cdot Pa$ while the $H_2/Ar$ permselectivity increased from 4 to 70. The CVD process was then resumed with Recipe II at 600° C. for 2 hours. TEOS was introduced through a bubbler using Ar as a carrier gas at 4.4 ml/min on the inner side of the tubular membrane, while vacuum was used on the shell side at a pressure between 1 and 10 torr. A dilution gas of 11.7 ml/min was used, thereby decreasing the TEOS concentration from $0.112 \text{ mol/m}^3$ to $0.03 \text{ mol/m}^3$.

The permselective membrane device in Example 2 is a three-layer device as defined above. The intermediate layer resulted from CVD Recipe I whereas the surface layer resulted from CVD Recipe II. Following the Recipe II deposition, the permselectivity was increased to about 660, an increase of over 800 percent while the hydrogen permeance decreased by less than four percent. The layer formed from CVD Recipe I clearly exhibits different properties than the layer formed from CVD Recipe I. In particular, the second, low TEOS-concentration deposition resulted in a significant increase in permselectivity while only marginally decreasing hydrogen permeance.

EXAMPLE 3

The porous ceramic filter connected to dense ceramic tubing by the method described above was subjected to the deposition of a silica layer according to the aforementioned CVD process. First CVD Recipe III was used. TEOS was introduced through a bubbler using Ar as a carrier gas at 4.4 ml/min on the inner side of the tubular membranes, while a flow of Ar at 25.0 ml/min was maintained on the shell side of the reactor assembly. A dilution gas of 11.7 ml/min was used, thereby decreasing the TEOS concentration from $0.112 \text{ mol/m}^3$ to $0.03 \text{ mol/m}^3$. Thus, CVD Recipe III and II provide identical CVD reactant concentrations in the tube side of the alumina substrate but differ in the shell environment. The deposition was conducted at 600° C. for 12 hours. Table 4 shows the hydrogen and argon permeances and hydrogen/argon permselectivity at 600° C. before and after the deposition. The hydrogen permeance decreased from $5.51 \times 10^{-5} \text{ mol/m}^2 \cdot s \cdot Pa$ to $7.90 \times 10^{-8} \text{ mol/m}^2 \cdot s \cdot Pa$ while the hydrogen/argon permselectivity increased from 4.1 to 114.

TABLE 4

Gas Permeation of a Ceramic Filter Before and After CVD at 600° C.

| | Permeance ($mol/m^2 \cdot s \cdot Pa$) | | Permselectivity |
|---|---|---|---|
| | $H_2$ | Ar | $H_2/Ar$ |
| Before CVD | $5.51 \times 10^{-5}$ | $1.34 \times 10^{-5}$ | 4.1 |
| Recipe I | $7.90 \times 10^{-8}$ | $6.92 \times 10^{-10}$ | 114 |
| Recipe II | $5.22 \times 10^{-8}$ | $1.46 \times 10^{-10}$ | 356 |

The CVD process was then resumed with CVD Recipe II at 600° C. for 3.5 hours. TEOS was introduced through a bubbler using Ar as a carrier gas at 4.4 ml/min on the inner side of the tubular membrane, while vacuum was used on the shell side at a pressure between 1 and 10 torr. A dilution gas of 11.7 ml/min was used, thereby decreasing the TEOS concentration from 0.112 mol/m$^3$ to 0.03 mol/m$^3$.

Following the CVD Recipe II deposition, the hydrogen/argon permselectivity was increased to about 356, an increase of over 200 percent while the hydrogen permeance decreased by less than 34 percent. Again, the second, low TEOS concentration deposition resulted in a significant increase in hydrogen permselectivity relative to argon with only an approximately one-third drop in hydrogen permeance. Importantly, the three-layer arrangement formed from CVD Recipe III and II yielded acceptable hydrogen permselectivity with unusually high hydrogen permeance.

EXAMPLE 4

The porous ceramic filter connected to dense ceramic tubing by the method described above was subjected to the deposition of a silica layer according to the aforementioned CVD process. First CVD Recipe III was used. TEOS was introduced through a bubbler using Ar as a carrier gas at 4.4 ml/min on the inner side of the tubular membranes, while a flow of Ar at 25.0 ml/min was maintained on the shell side of the reactor assembly. A dilution gas of 11.7 ml/min was used, thereby decreasing the TEOS concentration from 0.112 mol/m$^3$ to 0.03 mol/m$^3$. The deposition was conducted at 600° C. for 2 hours. Table 5 shows the hydrogen and argon permeances and H$_2$/Ar

TABLE 5

Gas Permeation of a Ceramic Filter Before and After CVD at 600° C.

| | Permeance (mol/m$^2$ · s · Pa) | | Permselectivity |
|---|---|---|---|
| | H$_2$ | Ar | H$_2$/Ar |
| Before CVD | 4.27 × 10$^{-5}$ | 1.13 × 10$^{-5}$ | 3.8 |
| Recipe III for 2 hours | 3.40 × 10$^{-6}$ | 6.19 × 10$^{-7}$ | 5.5 |
| Recipe III for 4 hours | 2.14 × 10$^{-7}$ | 1.92 × 10$^{-9}$ | 111 |
| Recipe III for 5 hours | 1.61 × 10$^{-7}$ | 9.98 × 10$^{-10}$ | 161 |
| Recipe II for 1 hour | 1.25 × 10$^{-7}$ | 3.60 × 10$^{-10}$ | 345 | permselectivity at 600° C. before and after the deposition. The hydrogen permeance decreased from 4.27×10$^{-5}$ mol/m$^2$·s·Pa to 3.40×10$^{-6}$ mol/m$^2$·s·Pa while the H$_2$/Ar permselectivity increased from 3.8 to 5.5.

The CVD process then was resumed with Recipe III at 600° C. for another 2 hours. Following this additional 2 hours, the hydrogen permeance decreased to 2.14×10$^{-7}$ mol/m$^2$·s·Pa and the H$_2$/Ar permselectivity increased to 111. The CVD process was resumed with Recipe III at 600° C. for 1 more hour. This additional hour decreased the hydrogen permeance to 1.61×10$^{-7}$ mol/m$^2$·s·Pa but increased the H$_2$/Ar permselectivity to 161.

The CVD process was then resumed with CVD Recipe II at 600° C. for 1 hour. TEOS was introduced through a bubbler using Ar as a carrier gas at 4.4 ml/min on the inner side of the tubular membrane, while vacuum was used on the shell side at a pressure between 1 and 10 torr. A dilution gas of 11.7 ml/min was used, thereby decreasing the TEOS concentration from 0.112 mol/m$^3$ to 0.03 mol/m$^3$.

Following the CVD Recipe II deposition, the hydrogen permselectivity relative to argon was increased from 161 to 345 while the hydrogen permeance decreased from 1.61× 10$^{-7}$ mol/m$^2$·s·Pa to 1.25×10$^{-7}$ mol/m$^2$·s·Pa. Again, the second, low TEOS concentration deposition resulted in a significant increase in selectivity with only an approximately one-third drop in hydrogen permeance.

Again, this three-layer arrangement formed from CVD Recipe III and II yielded acceptable hydrogen permselec-tivity relative to argon with unusually high hydrogen permeance, this time on the order of 10$^{-7}$ mol/m$^2$·s·Pa.

EXAMPLE 5

Figure 4:
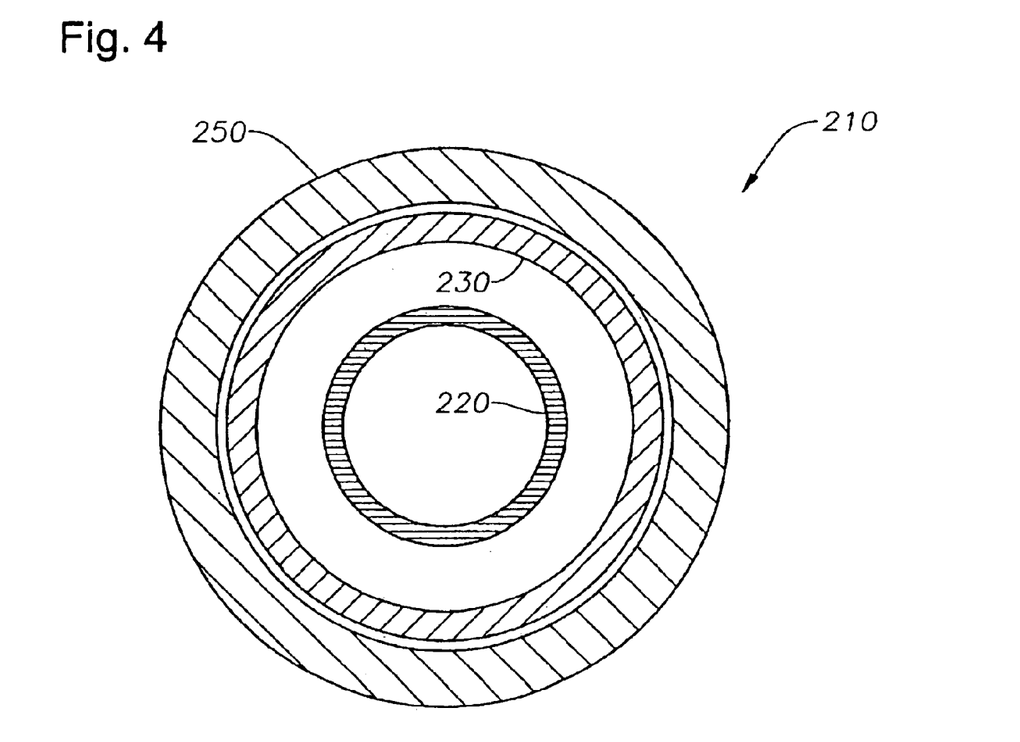
FIG. 4 is a cross sectional view of the CVD apparatus used in the preparation of the permselective membrane of the preferred embodiment.

The porous ceramic filter connected to dense ceramic tubing by the method described above was subjected to the deposition of a silica layer according to the aforementioned CVD process. CVD Recipe II was used. TEOS was introduced through a bubbler using Ar as a carrier gas at 4.4 ml/min on the inner side of the tubular membrane, while vacuum was used on the shell side at a pressure between 1 and 10 torr. A dilution gas of 11.7 ml/min was used, thereby decreasing the TEOS concentration from 0.112 mol/m$^3$ to 0.03 mol/m$^3$. The deposition was conducted at 600° C. for a total of 6 hours. FIG. 4 shows the hydrogen and argon permeances and H$_2$/Ar permselectivity at 600° C. as a function of deposition time measured after 0, 1, 2, 3, 4 and 6 hours of deposition. A H$_2$/Ar permselectivity of about 12 was accomplished with a hydrogen permeance of approximately 4×10$^{-7}$ mol/m$^2$·s·Pa.

Although the hydrogen permeance was a factor of three better than the previous example, the permselectivity was unacceptably low.

EXAMPLE 6

The porous ceramic filter connected to dense ceramic tubing by the method described above was subjected to the deposition of a silica layer according to the aforementioned CVD process. CVD Recipe IV was used. TEOS was introduced through a bubbler using Ar as a carrier gas at 4.4 ml/min on the inner side of the tubular membrane, while maintaining an Ar flow at 23.0 ml/min on the shell side of the reactor assembly. A dilution gas of 18.6 ml/min was used, thereby decreasing the TEOS concentration from 0.112 mol/m$^3$ to 0.02 mol/m$^3$. The deposition was conducted at 600° C. for 4 hours. Table 6 shows the H$_2$, CH$_4$, CO and CO$_2$ permeances and selectivities at 600° C. before and after the deposition.

TABLE 6

Gas Permeation of a Ceramic Filter Before and After CVD at 600° C.

| | Gas | Permeance (mol/m$^2$ · s · Pa) | Gases | Selectivity |
|---|---|---|---|---|
| Before CVD | H$_2$ | 3.95 × 10$^{-5}$ | | |
| | CH$_4$ | 1.62 × 10$^{-5}$ | H$_2$/CH$_4$ | 2.4 |
| | CO | 1.15 × 10$^{-5}$ | H$_2$/CO | 3.4 |
| | CO$_2$ | 8.38 × 10$^{-6}$ | H$_2$/CO$_2$ | 4.7 |
| After CVD | H$_2$ | 1.06 × 10$^{-7}$ | | |
| | CH$_4$ | 3.62 × 10$^{-12}$ | H$_2$/CH$_4$ | 29,000 |
| | CO | 7.69 × 10$^{-11}$ | H$_2$/CO | 1,400 |
| | CO$_2$ | 3.75 × 10$^{-11}$ | H$_2$/CO$_2$ | 2,800 |

Prior to CVD, the permselectivity measurements are in line with those expected for Knudsen diffusion, which for methane, carbon monoxide and carbon dioxide are expected to range from 2.8 to 4.9. After CVD, the hydrogen permselectivities relative to CH$_4$, CO and CO$_2$ increase to 29,000, 1,400 and 2,800, respectively, with a hydrogen permeance decrease from 3.95×10$^{-5}$ mol/m$^2$·s·Pa to 1.06×10$^{-7}$ mol/m$^2$·s·Pa.

These results, obtained at low TEOS concentration, offer not only high permselectivities but also unusually high hydrogen permeance. In fact, the permselectivities are similar to those reported in PCT Patent Application PCT/US00/02075 with a hydrogen permeance approximately one order of magnitude higher.

EXAMPLE 7

The porous ceramic filter connected to the dense ceramic tubing by the method described above was subjected to the deposition of an intermediate alumina layer by the aforementioned sol-gel method followed by the deposition of a silica layer according to the aforementioned CVD process. First, after preparation of the sol, the inside of the porous ceramic filter was dip coated for 5 seconds, dried at room temperature, and then calcined in air as described above. This dip coating-drying-calcination cycle was performed twice. Next, a silica layer was deposited using CVD Recipe IV. TEOS was introduced through a bubbler using Ar as a carrier gas at 4.4 ml/min on the inner side of the tubular membrane, while maintaining an Ar flow at 23.0 ml/min on the shell side of the reactor assembly. A dilution gas of 18.6 ml/min was used, thereby decreasing the TEOS concentration from 0.112 mol/m$^3$ to 0.02 mol/m$^3$. The deposition was conducted at 600° C. for 3.5 hours.

Figure 5:
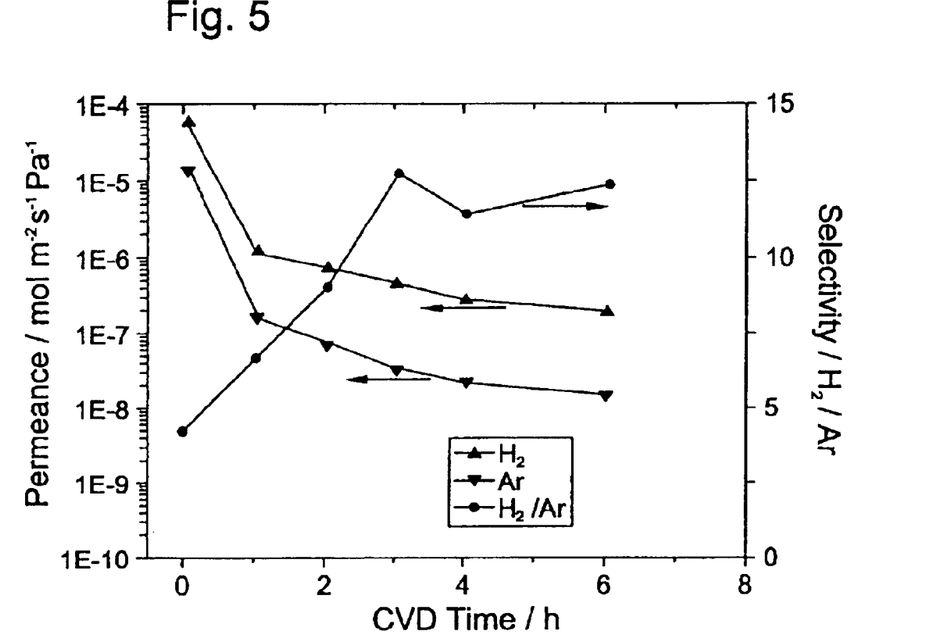
FIG. 5 is a graph of the hydrogen and argon permeances and selectivities as a function of deposition time of the CVD silica.
Figure 6:
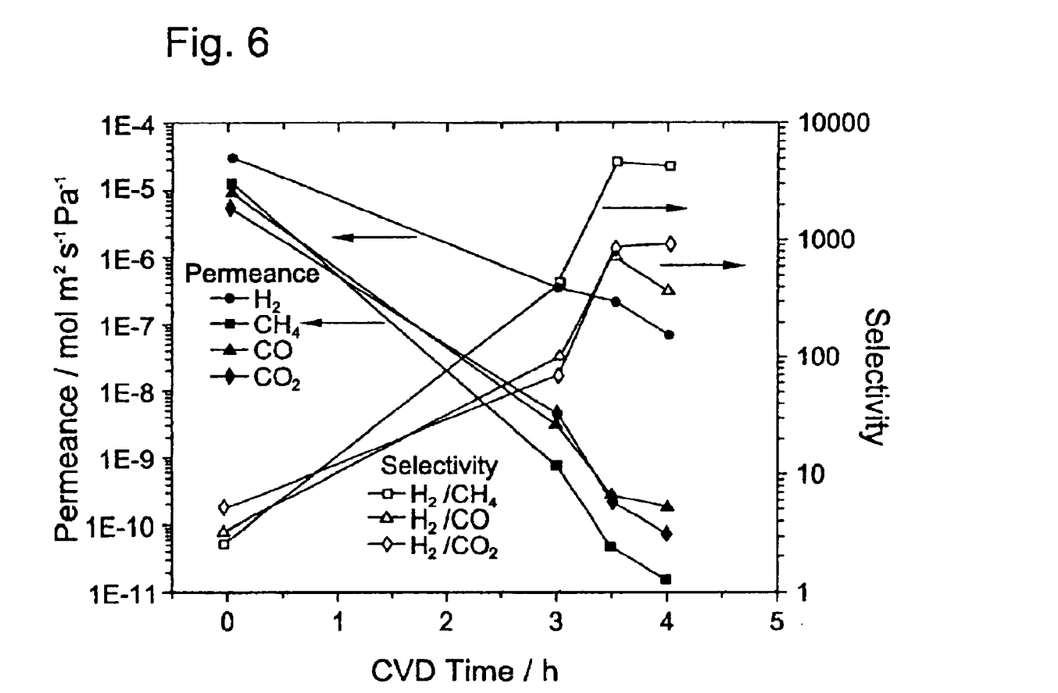
FIG. 6 is a graph of the hydrogen, methane, carbon monoxide and carbon dioxide permeances and selectivities as a function of chemical vapor deposition time of the silica film on the alumina sol-gel modified support.

FIG. 5 shows the evolution of permeance and permselectivity for $H_2$, $CH_4$, CO and $CO_2$ at 600° C. with CVD processing time. Table 7 summarizes the $H_2$, $CH_4$, CO and $CO_2$ permeances and

TABLE 7

Gas Permeation of a Ceramic Filter Before and After CVD at 600° C.

| | Gas | Permeance (mol/m$^2 \cdot$ s $\cdot$ Pa) | Gases | Selectivity |
|---|---|---|---|---|
| Before CVD | $H_2$ | 2.95 × 10$^{-5}$ | | |
| | $CH_4$ | 1.15 × 10$^{-5}$ | $H_2/CH_4$ | 2.6 |
| | CO | 8.79 × 10$^{-5}$ | $H_2$/CO | 3.4 |
| | $CO_2$ | 5.58 × 10$^{-6}$ | $H_2/CO_2$ | 5.3 |
| After CVD | $H_2$ | 2.16 × 10$^{-7}$ | | |
| | $CH_4$ | 4.66 × 10$^{-11}$ | $H_2/CH_4$ | 4,300 |
| | CO | 3.00 × 10$^{-10}$ | $H_2$/CO | 370 |
| | $CO_2$ | 2.54 × 10$^{-10}$ | $H_2/CO_2$ | 900 | selectivities at 600° C. before the CVD and after 3.5 hours of a silica deposition. Prior to CVD, the permselectivity measurements are approximately those expected for Knudsen diffusion, which for methane, carbon monoxide and carbon dioxide are expected to range from 2.8 to 4.9. After CVD, the $H_2$ permselectivities relative to $CH_4$, CO and $CO_2$ increase to 4,300, 370 and 900, respectively, with a hydrogen permeance decrease from 2.95×10$^{-5}$ mol/m$^2 \cdot$s$\cdot$Pa to 2.16×10$^{-7}$ mol/m$^2 \cdot$s$\cdot$Pa.

Like the prior example, the results indicate commercially-acceptable hydrogen permselectivities coupled with high hydrogen permeance.

EXAMPLE 8

The porous stainless steel filter connected to the non-porous stainless steel tubing by the method described above was subjected to the deposition of an intermediate alumina layer by the aforementioned sol-gel method followed by the deposition of a silica layer according to the aforementioned CVD process. First, after preparation of the sol, the inside of the porous stainless steel filter was dip coated for 5 seconds, dried at room temperature, and then calcined in air as described above. The dip coating-drying-calcination cycle was performed twice. Next, a silica layer was deposited by the CVD process described above. First CVD Recipe III was used. TEOS was introduced through a bubbler using Ar as a carrier gas at 4.4 ml/min on the inner side of the tubular membranes, while a flow of Ar at 25.0 ml/min was maintained on the shell side of the reactor assembly. A dilution gas of 11.7 ml/min was used, thereby decreasing the TEOS concentration from 0.112 mol/m$^3$ to 0.03 mol/m$^3$. The deposition was conducted at 600° C. for 40 hours. Table 8 shows the helium and argon permeances at 600° C. before and after the deposition. The He/Ar permselectivity was about 11.4. The CVD process was resumed with CVD Recipe II at 600° C. for 2 hours and the He/Ar permselectivity was increased to about 126.

TABLE 8

Gas Permeation of a Stainless Steel Filter Before and After CVD at 600° C.

| | Permeance (mol/m$^2 \cdot$ s $\cdot$ Pa) | | Permselectivity |
|---|---|---|---|
| | He | Ar | He/Ar |
| Before CVD | 3.24 × 10$^{-7}$ | 8.89 × 10$^{-8}$ | 3.6 |
| Recipe III for 40 hours | 2.87 × 10$^{-9}$ | 2.51 × 10$^{-10}$ | 11.4 |
| Recipe II for 2 hours | 2.83 × 10$^{-9}$ | 8.97 × 10$^{-11}$ | 126 |

Initial tests suggest that the membranes disclosed in the preferred embodiments of the present invention have some susceptibility to moisture under high temperature conditions. However, the membranes disclosed in the preferred embodiments of the present invention offer significant resistance to hydrothermal conditions and it is believed that further testing and development will yield membranes offering enhanced resistance to moisture at high temperatures.

While the preferred embodiments of the present invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention.

Accordingly, the scope of protection is not limited by the description set out above, but is only limited by the claims which follow, that scope including all equivalents of the subject matter of the claims. Each and every claim is incorporated into the specification as an embodiment of the present invention. Thus the claims are a further description and are an addition to the preferred embodiments of the present invention. Use of the term "optional" with respect to any element of a claim is intended to mean that the subject element is required, or alternatively, is not required. Both alternatives are intended to be within the scope of the claim. The discussion of a reference in the Description of Related Art is not an admission that it is prior art to the present invention, especially any reference that may have a publication date after the priority date of this application. The disclosures of all patents, patent applications and publications cited herein are hereby incorporated herein by reference, to the extent that they provide exemplary, procedural or other details supplementary to those set forth herein.

What is claimed is:

1. A permselective asymmetric membrane comprising a surface layer and a porous substrate layer wherein said surface layer is deposited by the chemical vapor deposition of a CVD reactant gas having a concentration of less than 0.03 mole/m$^3$ in a CVD gas stream wherein said deposition is carried out such that said membrane has a hydrogen permeance of at least 5×10$^{-8}$ mol/m$^2 \cdot$s$\cdot$Pa and a permselectivity of at least 100 for hydrogen relative to argon.

2. The permselective asymmetric membrane of claim 1 wherein the surface layer is comprised of a material selected from the group consisting of silica, alumina, zirconia, titania, silicon nitride, silicon carbide and zeolites.

3. The permselective asymmetric membrane of claim 1 wherein the porous substrate layer is selected from the group consisting of porous metals, porous ceramics and porous refractory metal oxides.

4. The permselective asymmetric membrane of claim 1 wherein the porous substrate layer is selected from the group consisting of porous alumina, porous modified alumina, porous titania, porous carbon and porous stainless steel.

5. The permselective asymmetric membrane of claim 1 wherein the surface layer is comprised of silica.

6. The permselective asymmetric membrane of claim 5 wherein the CVD reactant gas comprises tetraethyl orthosilicate and the CVD gas stream lacks substantial concentrations of oxygen, ozone and moisture.

7. The permselective asymmetric membrane of claim 1 further comprising at least one or more porous intermediate layers.

8. The permselective asymmetric membrane of claim 7 wherein at least one of the one or more porous intermediate layers is deposited by chemical vapor deposition.

9. The permselective asymmetric membrane of claim 7 wherein at least one of the one or more porous intermediate layers is deposited by sol gel deposition.

10. The permselective asymmetric membrane of claim 1 wherein said membrane has a permeance of at least $1 \times 10^{-7}$ mol/m$^2$·s·Pa for hydrogen and a permselectivity of at least 300 for hydrogen argon.

11. A permselective asymmetric membrane comprising a surface layer, one or more porous intermediate layers and a porous substrate layer wherein said surface layer and at least one porous intermediate layer are deposited by chemical vapor deposition of a CVD reactant gas in a CVD gas stream, such that said membrane has a hydrogen permeance of at least $5 \times 10^{-8}$ mol/m$^2$·s·Pa and a permselectivity of at least 100 for hydrogen relative to argon.

12. The permselective asymmetric membrane of claim 11 wherein the surface layer is comprised of a material selected from the group consisting of silica, alumina, zirconia, titania, silicon nitride, silicon carbide, and zeolites.

13. The permselective asymmetric membrane of claim 11 wherein the porous substrate layer is selected from the group consisting of porous metals, porous ceramics and porous refractory metal oxides.

14. The permselective asymmetric membrane of claim 11 wherein the porous substrate layer is selected from the group consisting of porous alumina, porous modified alumina, porous titania, porous carbon and porous stainless steel.

15. The permselective asymmetric membrane of claim 12 wherein the surface layer and at least one porous intermediate layer comprise distinct layers of silica.

16. The permselective asymmetric membrane of claim 15 wherein the CVD reactant gas is selected from the group consisting of tetraethyl orthosilicate, tetraethyl silicates, tetraisopropyl silicates, tetramethyl silicates, and chlorosilanes including chloro-, dichloro-, and trichloromethyl silanes.

17. The permselective asymmetric membrane of claim 16 wherein the CVD gas stream lacks substantial concentrations of oxygen, ozone and moisture.

18. The permselective asymmetric membrane of claim 15 wherein the CVD reactant gas is tetraethyl orthosilicate.

19. The permselective asymmetric membrane of claim 18 wherein the CVD gas stream lacks substantial concentrations of oxygen, ozone and moisture.

20. The permselective asymmetric membrane of claim 18 wherein the concentration of tetraethyl orthosilicate in the reactant gas stream is about 0.112 mole/m$^3$ or less during the chemical vapor deposition of at least one layer.

21. The permselective asymmetric membrane of claim 18 wherein the concentration of tetraethyl orthosilicate in the reactant gas stream is about 0.03 mole/m$^3$ or less during the chemical vapor deposition of at least one layer.

22. The permselective asymmetric membrane of claim 12 wherein the surface layer and at least one porous intermediate layer comprise distinct layers.

23. The permselective asymmetric membrane of claim 11 wherein said membrane has a permeance of at least $1 \times 10^{-7}$ mol/m$^2$·s·Pa for hydrogen and a permselectivity of at least 300 for hydrogen relative to argon.

24. A permselective asymmetric membrane comprising a surface layer and a porous substrate layer, said membrane having a permeance of at least $5 \times 10^{-8}$ mol/m$^2$·s·Pa for hydrogen and a permselectivity of at least 100 for hydrogen relative to argon.

25. The permselective asymmetric membrane of claim 24 wherein the surface layer is comprised of a material selected from the group consisting of silica, alumina, zirconia, titania, silicon nitride, silicon carbide and zeolites.

26. The permselective asymmetric membrane of claim 24 wherein the porous substrate layer is selected from the group consisting of porous metals, porous ceramics and porous refractory metal oxides.

27. The permselective asymmetric membrane of claim 24 wherein the porous substrate layer is selected from the group consisting of porous alumina, porous modified alumina, porous titania, porous carbon and porous stainless steel.

28. The permselective asymmetric membrane of claim 24 wherein the surface layer is deposited by chemical vapor deposition (CVD) of a CVD gas stream comprising a CVD reactant gas.

29. The permselective asymmetric membrane of claim 28 wherein the CVD reactant gas is present in the CVD gas stream at a concentration of less than about 0.112 mole/m$^3$.

30. The permselective asymmetric membrane of claim 28 wherein the CVD reactant gas is present in the CVD gas stream at a concentration of less than about 0.03 mole/m$^3$.

31. The permselective asymmetric membrane of claim 28 wherein the surface layer is comprised of silica.

32. The permselective asymmetric membrane of claim 31 wherein the CVD reactant gas is selected from the group consisting of tetraethyl orthosilicate, tetraethyl silicates, tetraisopropyl silicates, tetramethyl silicates, and chlorosilanes including chloro-, dichloro-, and trichloromethyl silanes.

33. The permselective membrane of claim 31 wherein the CVD reactant gas comprises tetraethyl orthosilicate.

34. The permselective asymmetric membrane of claim 33 wherein the CVD gas stream lacks substantial concentrations of oxygen, ozone and moisture.

35. The permselective asymmetric membrane of claim 28 further comprising one or more porous intermediate layers.

36. The permselective asymmetric membrane of claim 35 wherein at least one of the one or more porous intermediate layers is deposited by chemical vapor deposition.

37. The permselective asymmetric membrane of claim 36 wherein the surface layer and at least one of the one or more porous intermediate layers are deposited using the same CVD reactant gas under different deposition conditions.

38. The permselective asymmetric membrane of claim 37 wherein the CVD reactant gas is tetraethyl orthosilicate and the CVD reactant gas is present in the CVD gas stream at a concentration of less than about 0.112 mole/m$^3$.

39. The permselective asymmetric membrane of claim 38 wherein the CVD gas stream lacks substantial concentrations of oxygen, ozone and moisture.

40. The permselective asymmetric membrane of claim 35 wherein at least one of the one or more porous intermediate layers is deposited by a sol gel deposition.

41. The permselective asymmetric membrane of claim 40 wherein at least one of the one or more porous intermediate layers deposited by a sol gel deposition is selected from the group consisting of alumina, silica, titania and combinations thereof.

42. A permselective asymmetric membrane comprising a surface layer and a porous substrate layer, said membrane having a permeance of at least $1 \times 10^{-7}$ mol/m$^2 \cdot$s$\cdot$Pa for hydrogen and a permselectivity of at least 300 for hydrogen relative to argon.

43. The permselective asymmetric membrane of claim 42 wherein the desired permeate is hydrogen and the one or more undesired permeates are selected from the group consisting of carbon monoxide, methane, carbon dioxide, ammonia, hydrogen sulfide and water.

44. The permselective asymmetric membrane of claim 43 wherein the one or more undesired permeates are selected from the group consisting of methane and carbon dioxide.

45. The permselective asymmetric membrane of claim 43 wherein the undesired permeates are selected from the group consisting of carbon monoxide, methane, carbon dioxide and water.

46. The permselective asymmetric membrane of claim 43 wherein the undesired permeates are selected from the group consisting of ammonia and nitrogen.

47. The permselective asymmetric membrane of claim 43 wherein one of the undesired permeates is hydrogen sulfide.

* * * * *

UNITED STATES PATENT AND TRADEMARK OFFICE
CERTIFICATE OF CORRECTION

PATENT NO. : 6,854,602 B2
DATED : February 15, 2005
INVENTOR(S) : Shigeo Ted Oyama et al.

It is certified that error appears in the above-identified patent and that said Letters Patent is hereby corrected as shown below:

Title page,
Item [75], Inventors, delete "Zang" and insert -- Zhang --.
Item [56], References Cited, OTHER PUBLICATIONS,
"A.K. Prabhu and S.T. Oyama," second reference, delete "Cermaic" and insert -- Ceramic --.

Column 3,
Line 66, delete "H21N2" and insert -- H2/N2 --.

Column 9,
Line 4, delete "5 μm" and insert -- 5 nm --.
Line 20, delete "calcinations" and insert -- calcination --.

Signed and Sealed this

Thirty-first Day of January, 2006

JON W. DUDAS
*Director of the United States Patent and Trademark Office*